Dec. 13, 1932.   C. HURTADO   1,890,608
WATERING DEVICE
Filed Nov. 25, 1931
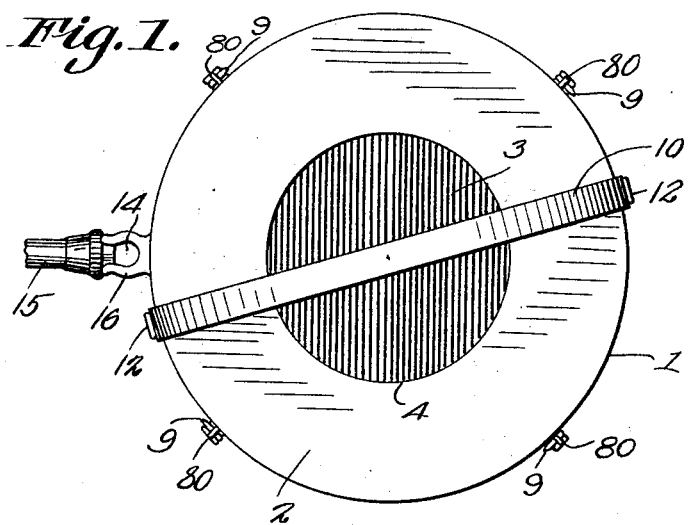
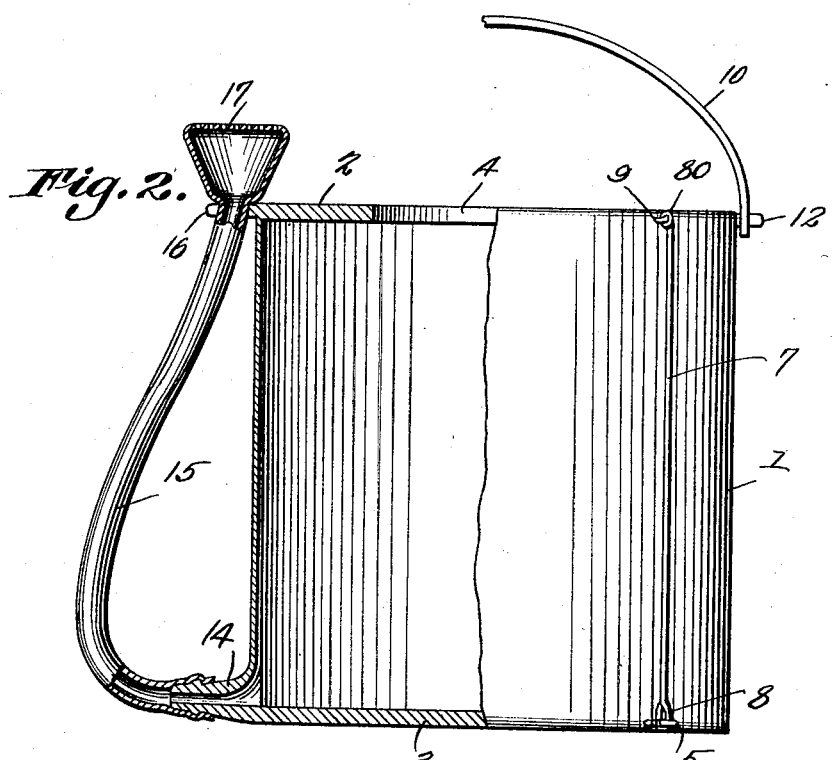
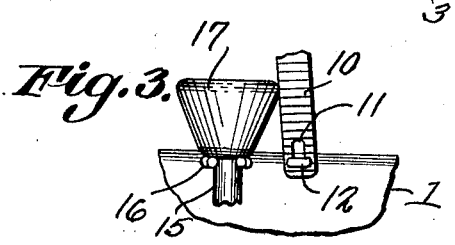
Inventor
Carlos Hurtado
By C.A. Snow & Co.
Attorneys.

Patented Dec. 13, 1932

1,890,608

UNITED STATES PATENT OFFICE

CARLOS HURTADO, OF NEW YORK, N. Y.

WATERING DEVICE

Application filed November 25, 1931. Serial No. 577,333.

By way of explanation it may be stated that it is frequently necessary to carry a sprinkling pot to a grave yard, or elsewhere, for the purpose of watering flowers, and since a sprinkling pot is not an article which can be carried conveniently in a subway or other crowded place, and since a person, in general, does not care to appear in the street, carrying a sprinkling pot, the present invention aims to provide a sprinkling pot which can be collapsed readily, and carried as a package which will attract no attention on account of peculiarities of appearance.

Another object of the invention is to provide novel means for holding the sprinkling pot expanded or extended, and in position for use. Another object of the invention is to provide novel means whereby water will not escape from the nozzle of the sprinkling pot, when it is not desired to carry on the sprinkling operation. Another object of the invention is to provide novel means for positioning the bail without using additional parts for that purpose, the bail being so located and sustained that it will be in a position for use in lifting the sprinkling pot or carrying it about.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:—

Figure 1 shows in top plan, a device constructed in accordance with the invention;
Figure 2 is a side elevation where the parts are in section;

Figure 3 is a fragmental side elevation showing how the bail is upheld.

The sprinkling pot forming the subject matter of this application preferably is of one-piece construction, aside from the outlet conduit and the bail, and is made of rubber or a rubber compound, throughout. It comprises a flexible body 1, to which is integrally connected a top 2 and a bottom 3, the top 2 and the bottom 3 preferably being somewhat thicker than the body 1 and being stiff. In the top 2 there is an opening 4 of sufficient size to permit the introduction of water into the body 1, the top also preventing the water from spilling out of the device. On the body 1, in alignment with the bottom 3 are T-shaped pivot elements 5, made of the same material as the body 1 and extended transversely of the body, that is, parallel to the bottom 3. By locating the pivot elements 5 in alignment with the bottom 3, the mounting of the pivot elements is made the more secure. On the upper edge of the body 1, in alignment with the top 2 there are keepers or eyes 80, made of the same material as the body 1. By locating the eyes 80 in the same plane with the top 2, the eyes are made secure in their mounting.

Vertical spreaders 7 are provided, and may be made of metal which is stiff enough to hold the body 1 upright and extended, as shown in Figure 2 of the drawing. The spreaders 7 are provided at their lower ends with vertically elongated eyes 8, and at the upper ends of the spreaders 7 there are hooks 9. When the device is not in use, the spreaders 7 may be taken off and carried conveniently in any desired way. In order to mount the spreaders 7 in place, they are disposed horizontally, so that the eyes 8 on the spreaders can be slipped over the T-shaped pivot elements 5. The spreaders 7, having been turned into a vertical position, have their hooks 9 engaged with the eyes 80, and, thus, the device will be held extended, and in a position to receive water, as shown in Figure 2 of the drawing.

The bail 10 may be made of any desired material, but it should be stiff enough so that it will not collapse down on the top 2. In the lower ends of the bail 10 there are elongated slots 11. By turning the bail 10 to a horizontal position, the slots 11 may be engaged with T-shaped fasteners 12 on the body 1, 100 in alignment with the top 2. The fasteners 12 are constructed like the pivot elements 5, and are formed of the same material as the body 1, the fasteners being located in alignment with the top 2. It is obvious that the bail 10 can be swung upwardly on the fasteners 12 into the position of Figure 1, and into the position of Figure 3, or the bail can be swung downwardly in the usual way, to hang along side of the body 1.

On the lower end of the body 1 there is an outstanding nipple 14, and this nipple is formed integrally with the bottom 3 and with the body 1. Because the nipple 14 is formed integrally with the bottom, as aforesaid, and as shown in Figure 2 of the drawing, the mounting of the nipple is made secure, and the nipple is adapted to have slipped over it, the lower end of a flexible tube 15 carrying, at its upper end, a flaring nozzle 17, adapted to be received in a fork-shaped holder 16 on the body 1, the holder being formed integrally with the body 1 and with the top 2.

When the tube 15 is held in the position of Figure 2, the water cannot, of course, run out of the body 1, but by detaching the tube from the holder 16, the water may be sprayed about, wherever desired, through the perforated nozzle 17.

The bail 10 can be swung upwardly and laterally into the inclined position of Figure 3, and when the bail is so disposed, it will rest against the nozzle 17. The nozzle, thus, forms a support for the bail, and keeps the bail in a substantially upright position, in which it may be taken hold of readily.

The device forming the subject matter of this application is simple in construction, but it affords a means whereby a sprinkling pot may be collapsed and be carried about in a small package, without attracting attention, the sprinkling pot, when in condition for use, possessing all of the advantages to be attributed to a sprinkling pot made out of tin or other stiff metal.

Having thus described the invention, what is claimed is:—

1. A sprinkling pot comprising a body having an outlet, a tube assembled with the outlet, a nozzle carried by the tube, means on the body for holding the tube upwardly extended, a bail resting against the nozzle, the nozzle holding the bail in a substantially upright position, for use, and pivot elements connecting the bail with the body, the nozzle engaging the bail above the pivot elements.

2. A sprinkling pot comprising a top, a flexible body and a bottom, the top having an outlet, keepers on the body, in alignment with the upper end thereof, T-shaped pivot elements on the body, in alignment with the bottom, and spreaders having means for engaging the keepers detachably, the spreaders being provided at their lower ends with elongated eyes which can be slipped over the pivot elements when the spreaders are in a substantially horizontal position, the pivot elements extending transversely of the eyes of the spreaders, thereby to keep the spreaders securely but detachably assembled with the pivot elements, when the spreaders are swung upwardly for engagement with the keepers.

3. A sprinkling pot comprising a body provided at its upper end with an outstanding holder, a stop extended upwardly above the upper end of the body and mounted removably in the holder, a bail pivoted to the body, below the upper end of the stop, and resting against the stop, to hold the bail in a substantially vertical position, for use, and a flexible connection between the stop and the lower part of the body, and preventing a loss of the stop, the flexible connection being an outlet tube for the body, and the stop being a discharge nozzle for the tube.

In testimony that I claim the foregoing as my own, I have hereto affixed my signature.

CARLOS HURTADO.